United States Patent [19]
Ricks

[11] Patent Number: 4,844,538
[45] Date of Patent: Jul. 4, 1989

[54] SUNROOF AIR DEFLECTOR

[76] Inventor: Ronald S. Ricks, 3991 Blacklick Rd., Baltimore, Ohio 43105

[21] Appl. No.: 183,904

[22] Filed: Apr. 20, 1988

[51] Int. Cl.⁴ .............................................. B60J 7/22
[52] U.S. Cl. ..................................... 296/217; 98/2.14
[58] Field of Search ............... 296/217, 216, 210, 224, 296/91, 218, 15; 98/2.14, 2.11, 2.12, 2; 16/DIG. 13, 337, 342, 254, 257, 259; 49/394, 465; 411/155; 292/207; 244/129.3, 121

[56] References Cited

U.S. PATENT DOCUMENTS

| | | | |
|---|---|---|---|
| 3,853,371 | 12/1974 | Bieniert | 296/217 |
| 3,973,478 | 8/1976 | Gotz | 296/217 |
| 4,396,224 | 8/1983 | Hayakawa | 296/217 |

FOREIGN PATENT DOCUMENTS 2339679  2/1975  Fed. Rep. of Germany ...... 296/217

Primary Examiner—Joseph F. Peters, Jr.
Assistant Examiner—Clifford T. Bartz
Attorney, Agent, or Firm—Richard C. Litman

[57] ABSTRACT

A sunroof air deflector is disclosed which includes a spring loaded telescoping air deflector blade rotatably attached to two end mounting pieces. The angle of the blade is adjustable and can be locked in place for downward or upward draft, and the angle can be locked by a pin on one end of the blade that engages one of a plurality of holes on the corresponding end piece. The spring loading puts outward force on the end pieces, which feature forked extensions to grip the inside of the sunroof. The blade may be compressed for installation or removal in the sunroof opening.

5 Claims, 2 Drawing Sheets

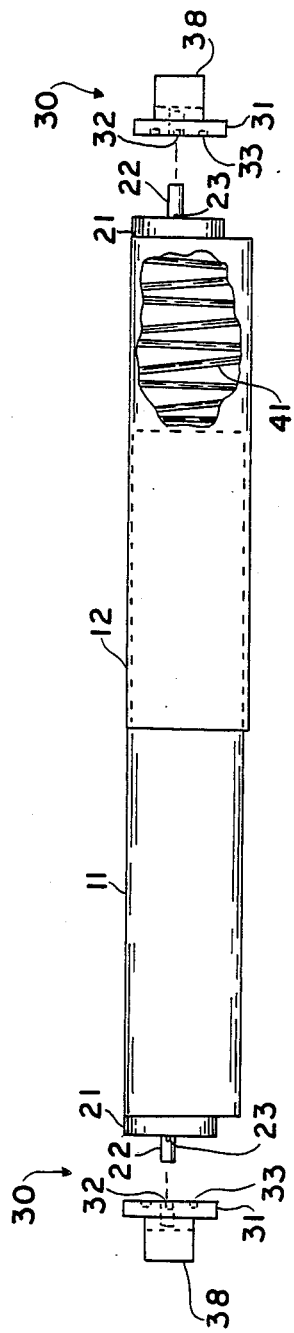
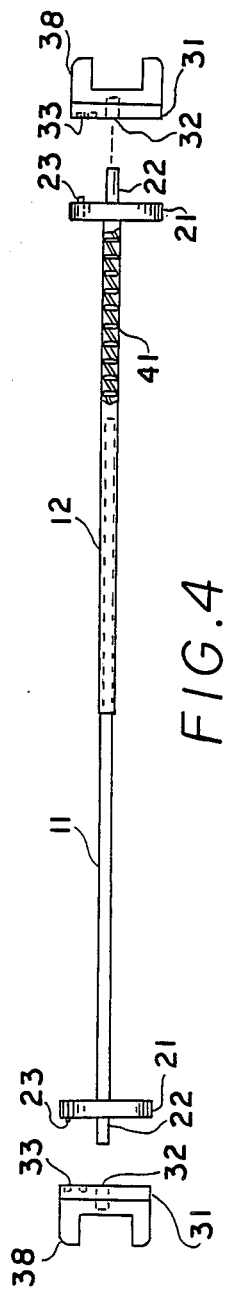
FIG.3
FIG.4
FIG.6
FIG.5

SUNROOF AIR DEFLECTOR

BACKGROUND OF INVENTION

Vehicles of many types, including automobiles, are often provided with a sunroof opening in the vehicle roof. These sunroof openings can significantly enhance the pleasure of the driver and passengers of the vehicle by allowing sunlight to enter the vehicle and by providing air ventilation through the roof of the car. Most conventional sunroofs provide little, if any, control of the amount of direction of the air ventilation through the sunroof opening. The airflow through the sunroof may cause undesirable turbulence and buffeting within the vehicle. In other cases, the sunroof opening may not provide adequate ventilation. For example, most sunroofs have no provision for directing extra airflow towards the passengers in the rear of the vehicle.

FIELD OF THE INVENTION

The invention relates to an air deflector assembly for vehicles having a sunroof opening in the vehicle roof, and more particularly, the invention is directed to an improved sunroof air deflector that is portable and adaptable, so that it may be quickly and easily moved from one vehicle to another, and can be installed in vehicles with sunroof openings of different sizes.

The invention further relates to an improved sunroof air deflector which is directed to providing means for adjusting the angle of the deflector blade to direct air flow, either upwardly above the sunroof opening, or downwardly into the vehicle. The invention is also directed toward providing means for adjusting the fore and aft location of the blade, thereby giving the user greater flexibility regarding the direction and location of the air flow from the deflector in the sunroof opening.

The invention is suited to a wide range of vehicular sunroof types and applications, and the method of construction of the device is more fully described herein.

DESCRIPTION OF THE PRIOR ART

Various prior art sunroof air deflectors and the like, as well as their apparatuses and the methods of their construction in general are known and found to be exemplary of the U.S. prior art. The majority of these air deflectors are mounted permanently to the leading edge of the sunroof opening and angled to deflect air upward. For example, U.S. Pat. No. 4,662,671, issued to Davis teaches an air deflector which has flexible blades that pivot upwardly within a frame which is permanently mounted to the leading edge of the sunroof. U.S. Pat. No. 4,393,754, issued to Hough, discloses an air deflector assembly for vehicle sunroofs which does allow the pivotal adjustment of the deflector blade for downward air flow. The Hough invention is permanently mounted, and has no positive locking mechanism for the air deflector angle. A permanently mounted retractable air deflector for sunroofs is found in U.S. Pat. No. 4,492,406 to Matsubana.

These patents or known prior uses teach and disclose various types of sunroof opening air deflectors of sorts and of various manufactures, an the like, as well as methods of their construction in general; but none of them, whether taken singly or in combination, disclose the specific details of the combination of the invention in such a way as to bear upon the claims of the present invention.

SUMMARY OF THE INVENTION

An object, advantage and feature of the invention is to provide a novel sunroof air deflector that is adjustable in use, and that is easily installed and removed from sunroof openings of varying widths.

Another object of the invention is directed further to a device for providing easy adjustment of the fore and aft location of the air deflector as well as easy adjustment of the angle of the deflector. This is a substantial improvement over existing practices because it allows the user to more fully control the airflow and turbulence resulting from the sunroof opening.

Another object of the invention is to provide a novel and improved construction of a sunroof air deflector, to wit, the employment of two spring biased, telescoping deflector members to adjust to a range of sunroof opening widths.

Still another object of the invention is to provide a novel and improved method of construction of a mounting apparatus for a sunroof air deflector, whereby a forked member is urged against each side of the sunroof opening, allowing the deflector to be removably attached to the sunroof opening.

These together with other objects and advantages of the invention reside in the details of the process and the operation thereof, as is more fully hereinafter described and claimed. References are made to drawings forming a part hereof, wherein like numerals refer to like parts throughout.

DESCRIPTION OF THE SEVERAL VIEW OF THE DRAWINGS

FIG. 3 is a top view of the sunroof air deflector.

FIG. 4 is a front view of the sunroof air deflector.

FIG. 5 is a right and a left side view of one embodiment of the mounting apparatus of the present invention.

FIG. 6 is a side and front a sectional view of an alternative mounting apparatus of the invention.

DESCRIPTION OF THE PREFERRED EMBODIMENT OF THE INVENTION

Figure 1:
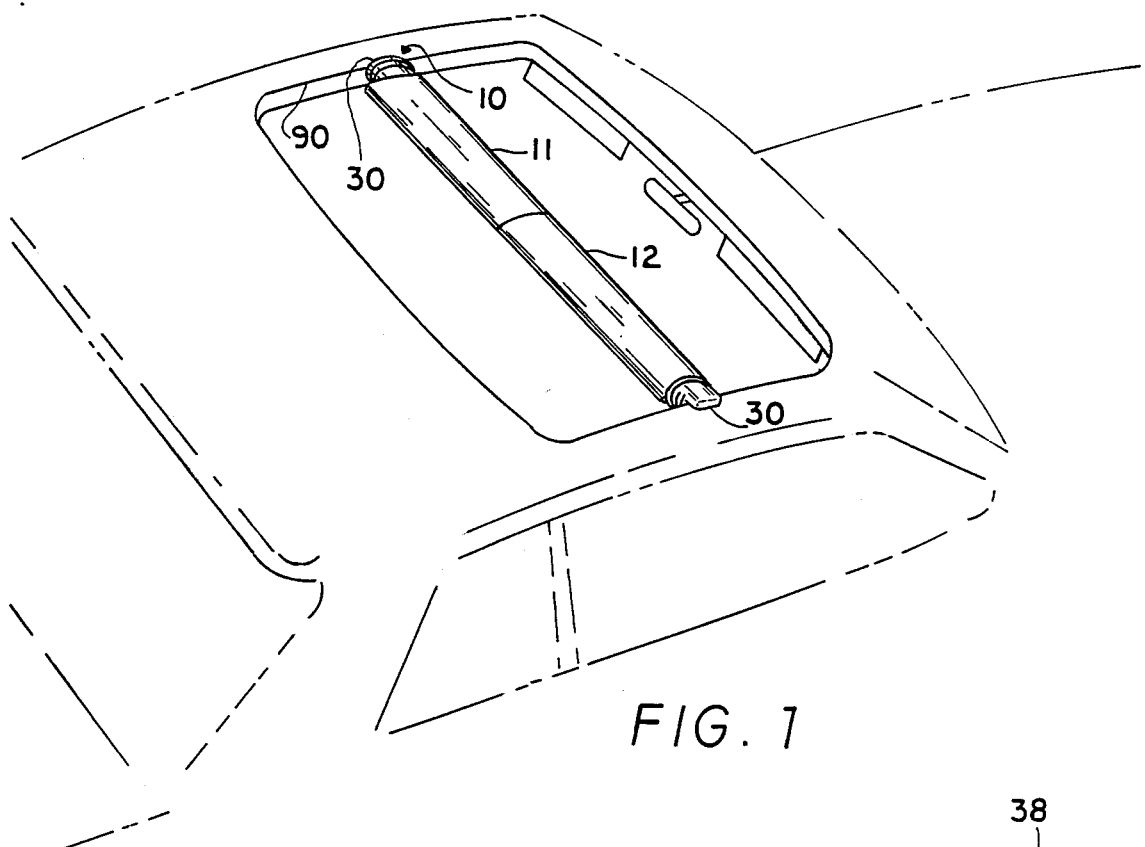
FIG. 1 is a prospective view of the sunroof air reflector in use in a vehicle sunroof opening, according to a preferred embodiment and best mode of the present invention.

Referring now to the drawings there is shown in FIG. 1 a sunroof air deflector 10 removably installed in a vehicle sunroof opening 90. The invention includes two telescoping air deflector members 11 and 12, and mounting means 30 at each end. The two telescoping portions 11 and 12 have a spring means (not shown in this view) enclosed therein. The spring means urges the portions 11 and 12 outward thereby providing an outward force against the mounting block 30, which holds the deflector in place against the sunroof opening 90. To remove the deflector, the user may simply compress the telescoping portions 11 and 12. This preferred construction allows the user to remove the sunroof air deflector from inside or outside the vehicle. The sunroof air deflector may be installed in a sunroof opening 90 without any drilling or other permanent alterations to the vehicle. The compressibility of the telescoping air deflector members 11 and 12 also allows the sunroof air deflector to adjust to a range of sunroof opening widths.

Figure 2:
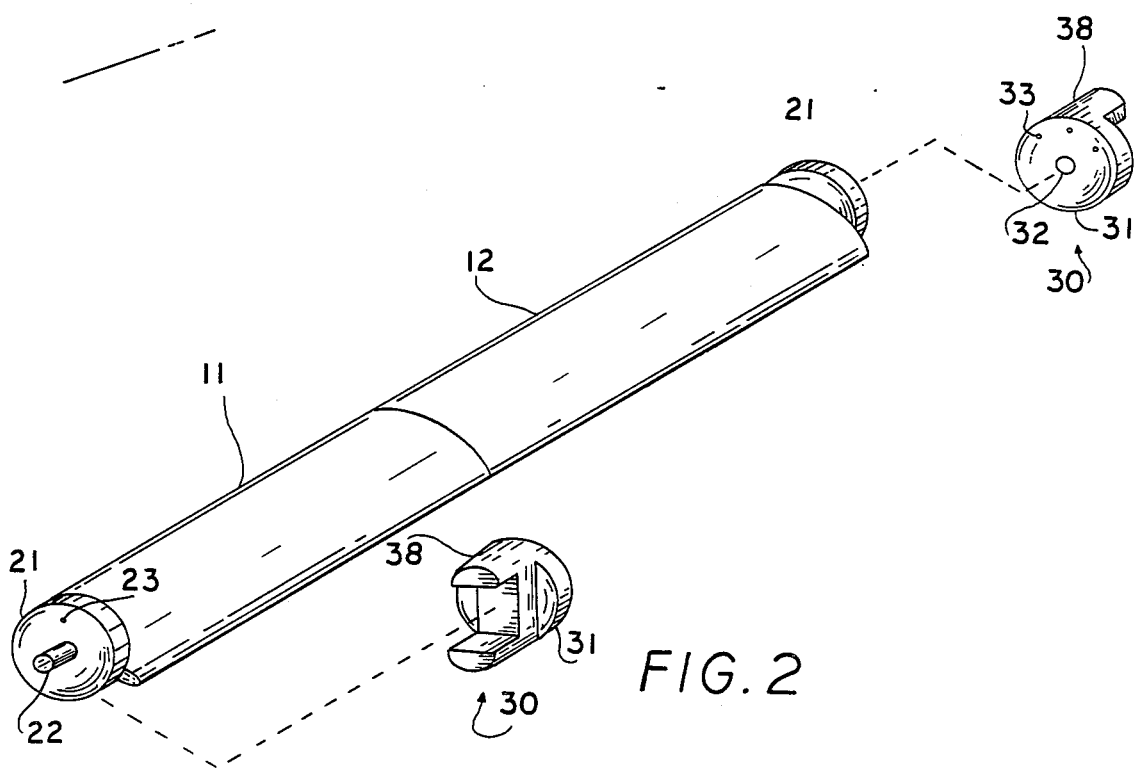
FIG. 2 is an exploded perspective view of the sunroof air deflector, according to a preferred embodiment and best mode of the invention.

Referring now to FIG. 2, telescoping air deflector members 11 and 12 each has a disk 21 attached to its distal end. The end also includes a pivot pin 22 and a locking pin 23. The pivot pin 22 engages pivot socket 32 located on the inside of attaching block 30, thereby allowing the air deflector members 11 and 12 to rotate along their longitudinal axis with respect to the mounting block 30. Locking pin 23 engages any of a plurality of locking sockets 33 on the mounting block 30 to prevent rotation of the air deflector members 11 and 12. In one embodiment of the invention, pivot pin 22 extends outwardly further than locking pin 23, so that in use, the operator may adjust the angle of the telescoping air deflector member 11 and 12 by slightly compressing and rotating the air deflector members 11 and 12. When the air deflector members 11 and 12 are positioned at the desired angle, and released, the locking pin 23 will engage an appropriate locking socket 33 on the mounting block 30.

FIGS. 3 and 4 show the construction of the sunroof air deflector in greater detail. Spring 41 is shown enclosed by telescoping air deflector member 12, and urging against air deflector member 11, thereby allowing air deflector member 11 to telescope into air deflector member 12. Spring 41 serves two purposes. First, it allows for installation and removal of the sunroof air deflector in a range of sunroof opening widths. Second, it provides an outward biasing of the mounting blocks 30 against the inside edge of the sunroof opening. Mounting block 30 includes disk 31, as well as pivot socket 32 and a plurality of locking sockets 33. Mounting block 30 also includes forked extensions 38 which support the deflector assembly in the sunroof opening.

FIGS. 5 and 6 show an alternative embodiment of the invention, wherein mounting block 30 includes a plurality of locking sockets 33. Locking pin 23 may be rigid or alternatively, as shown, may be attached with a spring biased against disk 21. A spring biased locking pin 23 allows the user to easily rotate the deflector members 11 and 12 without the need to compress members 11 and 12. Of course, any other ratchet or locking mechanism known to those skilled in the art would be applicable to rotatably connect each of the telescoping air deflector members 11 and 12 to their respective mounting block 30. Also, forked extension 38 may have any shape suitably designed to engage the side edges of a sunroof opening.

The foregoing is considered as illustrative only of the principles of the invention. Further, since numerous modifications and changes will readily occur to those skilled in the art it is not desired to limit the invention to the exact construction and operation shown and described, and accordingly all suitable modifications, and equivalents which may be resorted to fall within the scope of the invention.

I claim:

1. An air deflector assembly for use with a vehicle having a sunroof opening in the roof thereof, comprising;
   an elongated air deflector member, including two axially telescoping portions, said telescoping portions extending along a longitudinal axis;
   first spring means to outwardly bias said telescoping portions of said air deflector member along said longitudinal axis;
   means for detachably mounting said elongated air deflector member to said sunroof opening;
   means for permitting rotation of said elongated air deflector member about said longitudinal axis relative to said means for detachably mounting said air deflector member;
   means for selectively locking said elongated air deflector member against rotation about said longitudinal axis relative to said means for detachably mounting said air deflector member to said sunroof opening.

2. The air deflector assembly of claim 1 wherein;
   said means for detachably mounting said air deflector member to said sunroof opening comprises;
   a mounting block,
   a forked extension protruding from said mounting block, whereby said forked extension is urged against said sunroof opening by said first spring means.

3. The air deflector assembly of claim 1, wherein;
   said means for permitting rotation of said air deflector member about said longitudinal axis relative to said means for detachably mounting said deflector member to said sunroof opening comprises;
   a pivot pin connected to each of said telescoping portions, said pivot pin extending outwardly parallel to said longitudinal axis;
   a socket disposed on each of said mounting blocks;
   whereby said pivot pin fits into said socket to permit rotation of said air deflector member about an axis parallel to said longitudinal axis.

4. The air deflector assembly of claim 1, wherein;
   said means for selectively locking said elongated air deflector member against rotation about said longitudinal axis relative to said means for detachably mounting said air deflector member to said sunroof opening comprises;
   a locking pin connected to one of said axially telescoping portions, said locking pin extending outwardly parallel to and offset from said longitudinal axis;
   a plurality of locking sockets disposed on one of said mounting blocks;
   whereby said pin engages one of said locking sockets to selectively lock said air deflector member against rotation.

5. The air deflector assembly of claim 4, wherein;
   said locking pin has a tapered end, and said locking pin is retractably connected to one of said axially telescoping portions;
   said locking pin including a spring means to urge said locking pin outwardly against one of said mounting blocks;
   whereby said locking pin may extend outwardly to engage one of said locking sockets and to retract when sufficient rotational force is applied to said deflector, thereby permitting selective adjustment of the angle of said elongated air deflector member.

* * * * *